(12) United States Patent
Salama

(10) Patent No.: US 6,801,441 B2
(45) Date of Patent: Oct. 5, 2004

(54) PULSE WIDTH MODULATION FREQUENCY CONVERTER

(75) Inventor: Mikko Salama, Voikkaa (FI)

(73) Assignee: Ricotec Oy, Vantaa (FI)

(*) Notice: Subject to any disclaimer, the term of this patent is extended or adjusted under 35 U.S.C. 154(b) by 0 days.

(21) Appl. No.: 10/181,910

(22) PCT Filed: Jan. 30, 2001

(86) PCT No.: PCT/FI01/00087
§ 371 (c)(1),
(2), (4) Date: Oct. 17, 2002

(87) PCT Pub. No.: WO01/58000
PCT Pub. Date: Aug. 9, 2001

(65) Prior Publication Data
US 2003/0112643 A1 Jun. 19, 2003

(30) Foreign Application Priority Data
Feb. 4, 2000 (FI) .............................. 20000232

(51) Int. Cl.[7] .............................................. H02M 5/45
(52) U.S. Cl. ........................................................ 363/37
(58) Field of Search .............................. 363/34, 35, 36, 363/37

(56) References Cited

U.S. PATENT DOCUMENTS

| | | | |
|---|---|---|---|
| 4,447,868 A | | 5/1984 | Turnbull |
| 4,774,650 A | | 9/1988 | Kahkipuro et al. |
| 4,894,763 A | * | 1/1990 | Ngo ............................. 363/35 |
| 4,928,052 A | * | 5/1990 | Fujioka et al. ............... 318/762 |
| 4,984,147 A | | 1/1991 | Araki |
| 6,014,323 A | | 1/2000 | Aiello et al. |
| 6,134,126 A | * | 10/2000 | Ikekame et al. .............. 363/39 |
| 6,194,856 B1 | * | 2/2001 | Kobayashi et al. ........... 318/432 |
| 6,566,764 B2 | * | 5/2003 | Rebsdorf et al. ............. 290/44 |

FOREIGN PATENT DOCUMENTS

| | | |
|---|---|---|
| DE | 4105162 A | 8/1992 |
| JP | 10-313576 | 11/1998 |

* cited by examiner

Primary Examiner—Adolf Berhane
(74) Attorney, Agent, or Firm—Birch, Stewart, Kolasch & Birch, LLP

(57) ABSTRACT

A multi-phase voltage-controlled PWM frequency converter, comprising at least one control unit (23), at least one rectifier bridge (20) designed to be connected to a multi-phase supply network ($U_U$, $U_V$, $U_W$), a direct-voltage intermediate circuit and at least one controlled inverter bridge (21) for feeding at least one multi-phase load (22) with an alternating voltage ($U_S$, $U_R$, $U_T$) of varying magnitude and frequency. The inverter bridge has pulse width modulation-controlled semiconductor switches (V11–V16) and, in parallel with these, inverse-parallel connected diodes (D11–D16). The rectifier bridge has fully controllable semiconductor switches (V1–V6) and, in parallel with these, inverse-parallel connected diodes (D1–D6). The control unit controls the fully controllable semiconductor switches of the rectifier bridge in such manner that, in the upper arm, the switch of the phase concerned conducts substantially as long as the instantaneous value of the network phase voltage ($U_U$, $U_V$, $U_W$) in question is the most positive, and in the lower arm the switch of the phase concerned conducts substantially as long as the instantaneous value of the network phase voltage ($U_U$, $U_V$, $U_W$) in question is the most negative. The rectifier bridge (20) is connected to the inverter bridge (21) directly without a direct-voltage capacitor unit acting as an intermediate energy storage, and the direct current produced by the inverter bridge has been arranged to flow directly into the supply network without limitation of current peak value by an inductor unit.

6 Claims, 9 Drawing Sheets

$I_{DC}$:

Alternating
voltage and
current:
e.g. $U_u$, $I_u$

R
S
T

Phase switch
positions:

$\varphi \approx 75° \Rightarrow \cos\varphi = 0{,}26$

PULSE WIDTH MODULATION FREQUENCY CONVERTER

BACKGROUND OF THE INVENTION

1. Field of the Invention

The present invention relates to a multi-phase voltage-controlled Pulse Width Modulation (PWM) frequency converter, comprising a control unit, a rectifier bridge designed to be connected to a multi-phase supply line, a direct-voltage intermediate circuit and a controlled inverter bridge for supplying a multi-phase alternating voltage into a multi-phase load.

2. Description of Background Art

Three-phase voltage-controlled PWM frequency converters have a rectifier bridge for rectifying the three-phase alternating voltage of a supply line to produce a d.c. voltage for a direct-voltage intermediate circuit, and an inverter bridge for the inversion of the intermediate circuit direct voltage into a variable-frequency three-phase alternating voltage while power is flowing in the direction from the supply line to a load, such as a cage induction motor. A cage induction motor is generally used in many applications, e.g. pumps or fans. The inverter bridge is a full-wave bridge with pulse-width-modulation controlled semiconductor switches and with diodes connected in inverse-parallel with these. The rectifier bridge may be an uncontrolled full-wave bridge, in which case only diodes are used in it, or a controlled one, in which case it is provided with controlled semiconductor switches and with diodes connected in inverse-parallel with them. In the case of a controlled rectifier bridge, power may also flow in the direction from the load to the supply line, e.g. in situations where a motor is being braked. A known possibility for implementing a controlled rectifier bridge is a three-phase circuit as presented in U.S. Pat. No. 4,447,868, which allows power flow either from the a.c. circuit into the d.c. circuit or vice versa. According to the above-mentioned patent, conduction by the transistors of the rectifier bridge is so controlled that the transistor in the upper arm of the phase with the highest supply voltage instantaneous value and the transistor in the lower arm of the phase with the lowest supply voltage instantaneous value are conducting.

Prior-art solutions aim at maintaining a constant voltage in the direct-voltage intermediate circuit by using a high-capacitance d.c. capacitor as an intermediate energy storage. Prior-art solutions also generally use a three-phase a.c. inductor unit or a single-phase d.c. inductor unit in conjunction with the rectifier bridge in order to limit supply line current peaks.

The ratings of the capacitor unit are generally determined by the capacitors' ability to withstand the electric current and voltage loading applied to them and the required service life in extreme conditions. To determine the electric loading, the components generated by the rectifier and inverter circuits are generally first calculated separately and then summed quadratically. This is the procedure observed when the capacitor unit has a considerable capacitance, in which case the circuits can be regarded as separate circuits and their instantaneous values have no effect on each other. From these starting points it follows that the capacitance of the capacitor unit becomes fairly large because the preferable capacitor type, the electrolytic capacitor, has a relatively low current tolerance. On the other hand, a large capacitance value is advantageous in respect of various regulation functions (e.g. stability of motor voltage, operation in braking situations, operation in the event of a mains failure).

Due to the large capacitor unit, the direct voltage is nearly constant. As seen from the direction of the supply line, this has the consequence that, in order to limit the mains current peak values, a considerable amount of inductance is needed at some point along the current path. At present, this inductance is most commonly placed before the rectifier bridge, so it will simultaneously protect the rectifier bridge against supply line overvoltage spikes. The rating of the current limiting inductor is usually e.g. such that, with nominal current, the voltage prevailing across the inductor equals about 3–5% of the supply voltage.

Prior-art filter components are bulky and expensive. Therefore, they are a very great factor affecting the size and cost of a frequency converter.

SUMMARY AND OBJECTS OF THE INVENTION

The object of the present invention is to eliminate the drawbacks of prior-art solutions and to achieve a control arrangement that will make both the capacitor acting as an energy storage in the direct-voltage intermediate circuit and the inductor used to limit supply line current peaks superfluous.

The control arrangement makes it possible to connect the rectifier bridge to the inverter bridge directly without a direct-voltage capacitor unit acting as an intermediate energy storage, so that the direct current produced by the inverter bridge will flow directly into the supply line without current limitation by an inductor unit.

A multi-phase PWM frequency converter according to an embodiment of the invention uses a rectifier bridge which has fully controllable semiconductor switches and, in parallel with these, inverse-parallel connected diodes, and in which a control unit controls the conduction of the fully controllable semiconductor switches of the rectifier bridge so that the fully controllable semiconductor switch in the upper arm of the phase with the most positive supply voltage instantaneous value and the fully controllable semiconductor switch in the lower arm of the phase with the most negative supply voltage instantaneous value are continuously conducting. Thus, regardless of its direction, the intermediate circuit current can flow freely into the supply line. This embodiment of the invention is characterized in that the frequency converter requires no large-capacitance capacitor unit acting as an energy storage to smooth the intermediate circuit voltage, no large-inductance inductor unit to limit the peak values of supply line phase currents and no measurement of the supply line phase currents or of the direct current as in prior-art solutions.

A voltage-controlled multi-phase PWM frequency converter according to a second embodiment of the invention having diodes in its rectifier bridge is characterized in that the control unit produces the output voltage pulse pattern via the controllable semiconductor switches of the inverter bridge by a pre-determined method in such manner that, regardless of frequency and load, the output power factor remains above a preset minimum value, with the result that only positive current values appear in the intermediate circuit current. Therefore, the frequency converter need not be provided with a large-capacitance capacitor unit acting as an energy storage to smooth the intermediate circuit voltage nor with a high-inductance inductor unit to limit the peak values of the supply line phase currents.

The details of the features characteristic of the frequency converter of the invention are presented in the attached claims.

Although the PWM frequency converter of the invention requires no capacitor for smoothing the intermediate circuit d.c. voltage and no inductor for limiting the peak values of the mains current, a capacitor with a low capacitance value may still be used in order to limit the voltage spikes produced in switching situations by the energy latent in the stray inductances of the direct-voltage circuit. Similarly, a filter unit consisting of inductors with a low inductance value and capacitors with a low capacitance value may be used on the supply line side to filter off high-frequency harmonics from the supply current. However, these components have no essential importance in respect of the present invention.

BRIEF DESCRIPTION OF THE DRAWINGS

In the following, the invention will be described in detail by the aid of a few examples with reference to the attached drawings, wherein.

DETAILED DESCRIPTION OF THE PREFERRED EMBODIMENTS

EXAMPLE 1

Single-quadrant Drives

Figure 1:
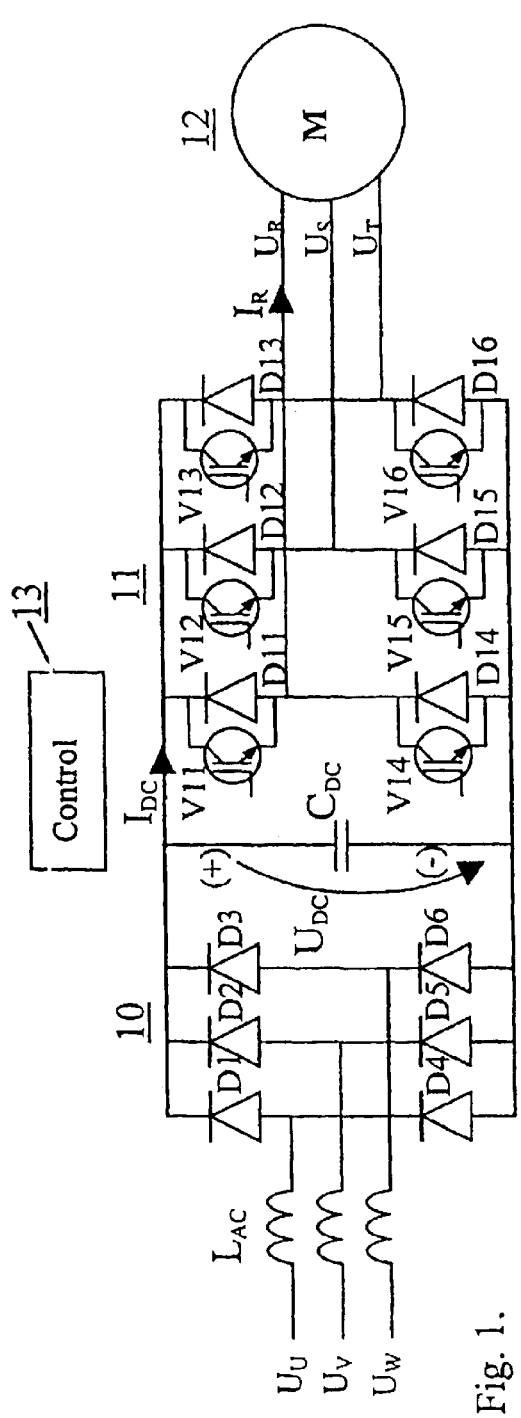
FIG. 1 presents a voltage-controlled PWM frequency converter.

FIG. 1 presents a three-phase voltage-controlled PWM frequency converter which comprises a rectifier bridge 10 for the rectification of a three-phase alternating voltage obtained from a supply line and comprising phase voltages $U_U$, $U_V$, $U_W$ so as to produce a d.c. intermediate circuit d.c. voltage $U_{DC}$, and an inverter bridge 11 for the inversion of the direct voltage of the d.c. intermediate circuit so as to produce a variable-frequency three-phase alternating voltage consisting of phase voltages $U_R$, $U_S$, and $U_T$. In such a frequency converter, power can only flow in the direction from the supply line to the load 12 (a three-phase cage induction motor M). The inverter bridge 11 is a full-wave bridge in which a control unit 13 controls the phase switches of each phase via pulse width modulation. "Phase switch" refers to the switch formed by the fully controllable semiconductor switches in the upper and lower arms of each phase (phase R: V11, V14; phase S: V12, V15; phase T: V13, V16; with inverse-parallel connected diodes D11–D16 in parallel with them). The rectifier bridge 10 is an uncontrolled full-wave bridge, consisting of a diode bridge with diodes D1–D6.

In previously known technology, the direct-voltage intermediate circuit is provided with a capacitor $C_{DC}$ for filtering the direct voltage and an inductor unit $L_{AC}$ at the input of the rectifier bridge 10 for limiting mains current peaks. As demonstrated later on, in the arrangement according to the present invention, both $C_{DC}$ and $L_{AC}$ are superfluous and the rectifier bridge 10 is connected to the inverter bridge 11 directly without a d.c. capacitor unit acting as an intermediate energy storage and the direct current $I_{DC}$ produced by the inverter bridge flows directly into the supply line without current limitation by an inductor unit.

The direction of the d.c. intermediate circuit current $I_{DC}$ produced by the inverter bridge 11 has an essential importance regarding the need for filtering in single-quadrant drives. For the intermediate circuit current produced by the inverter bridge, the following basic rules apply when the positive direction of the currents is toward the motor 12:

When all the phase switches are in the same position, then $I_{DC}=0$

When one of the switches is in the high position and two others are in the low position, then $I_{DC}$=the current of the phase with the phase switch in the high position, as a positive current.

When one of the switches is in the low position and two others are in the high position, then $I_{DC}$=the current of the phase with the phase switch in the low position, as a negative current.

Figure 2:
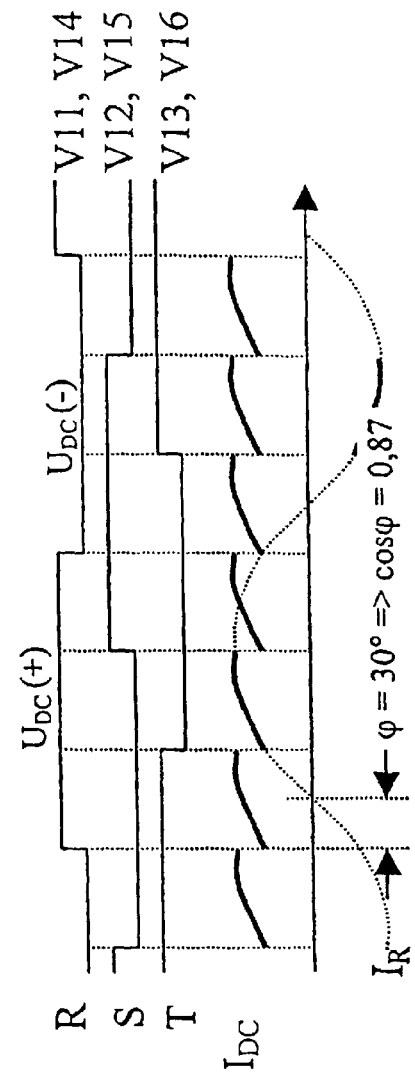
FIG. 2 illustrates the formation of current in the direct-voltage intermediate circuit.

FIG. 2 presents an example of how the current $I_{DC}$ is formed when it is assumed that the device is operated with a full voltage (output voltage containing 1 pulse/half-cycle), that the current is sinusoidal and the power factor cos $\phi=0.87$.

In this situation, the current $I_{DC}$ is always positive. Now, if the direct-voltage intermediate circuit has no filtering capacitor at all, then the supply current, e.g. $I_U$, consists directly of the d.c. current as in the example in FIG. 3. As there is no intermediate energy storage, the supply current peak value is limited to the magnitude of the direct current even without any inductances connected to the rectifier bridge to limit the current.

Figure 3:
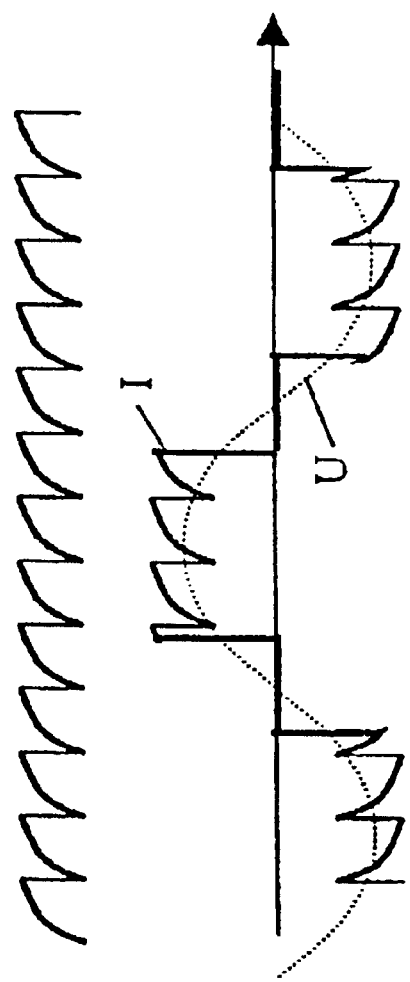
FIG. 3 illustrates the unfiltered direct current as well as the alternating current and voltage.
Figure 4:
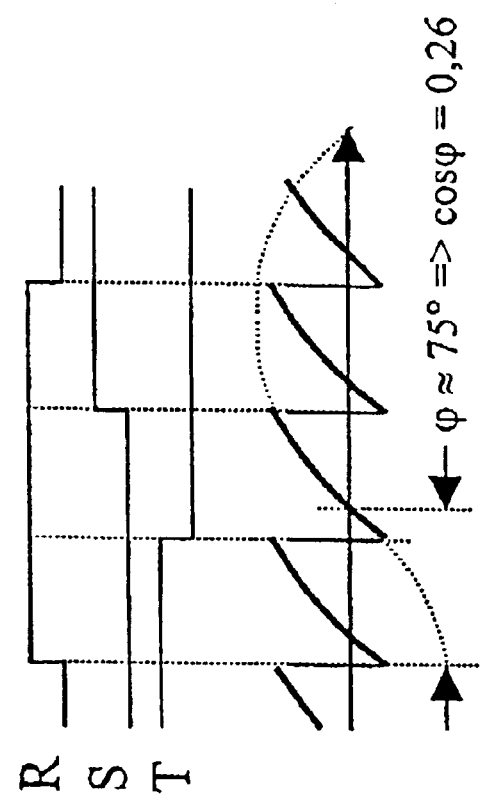
FIG. 4 illustrates the direct current at small power factor values.

As can be inferred from FIGS. 2 and 3, the direct current $I_{DC}$ is continuously positive as long as the motor circuit cos $\phi \geq 0.5$ (i.e. $\phi \leq 60°$). If cos $\phi$ is smaller than this, which is the situation in the case of small loads (FIG. 4), then the direct current is negative for part of the time. To prevent the d.c. voltage $U_{DC}$ from rising too much, it is necessary to add to the circuit a voltage clipper consisting of e.g. a series connection of a diode and a capacitor. A clipper with a small capacitance may be needed even during situations of a full positive current, because when abrupt changes occur in the direct current, the energy stored in the supply line inductances has to be discharged somewhere. The voltage of the clipper capacitor can be discharged e.g. by using it to power the control unit power supply.

In the case of partial voltages, when the output voltage contains several pulses/half-cycle, the situation in respect of a consideration of the current of the direct-voltage intermediate circuit is somewhat more complicated than in a full-voltage range as described in the previous example. However, the basic rules 1.–3. stated above apply in all situations, so the modulation method has a decisive effect on the eventual form of the intermediate circuit current. In respect of reducing the clipper circuit used to limit d.c. circuit voltage peaks, it will be advantageous if no negative d.c. pulses appear until the cos φ value is as small as possible. In the following passages, the direct current $I_{DC}$ will be considered with reference to a few different modulation methods.

Figure 5:
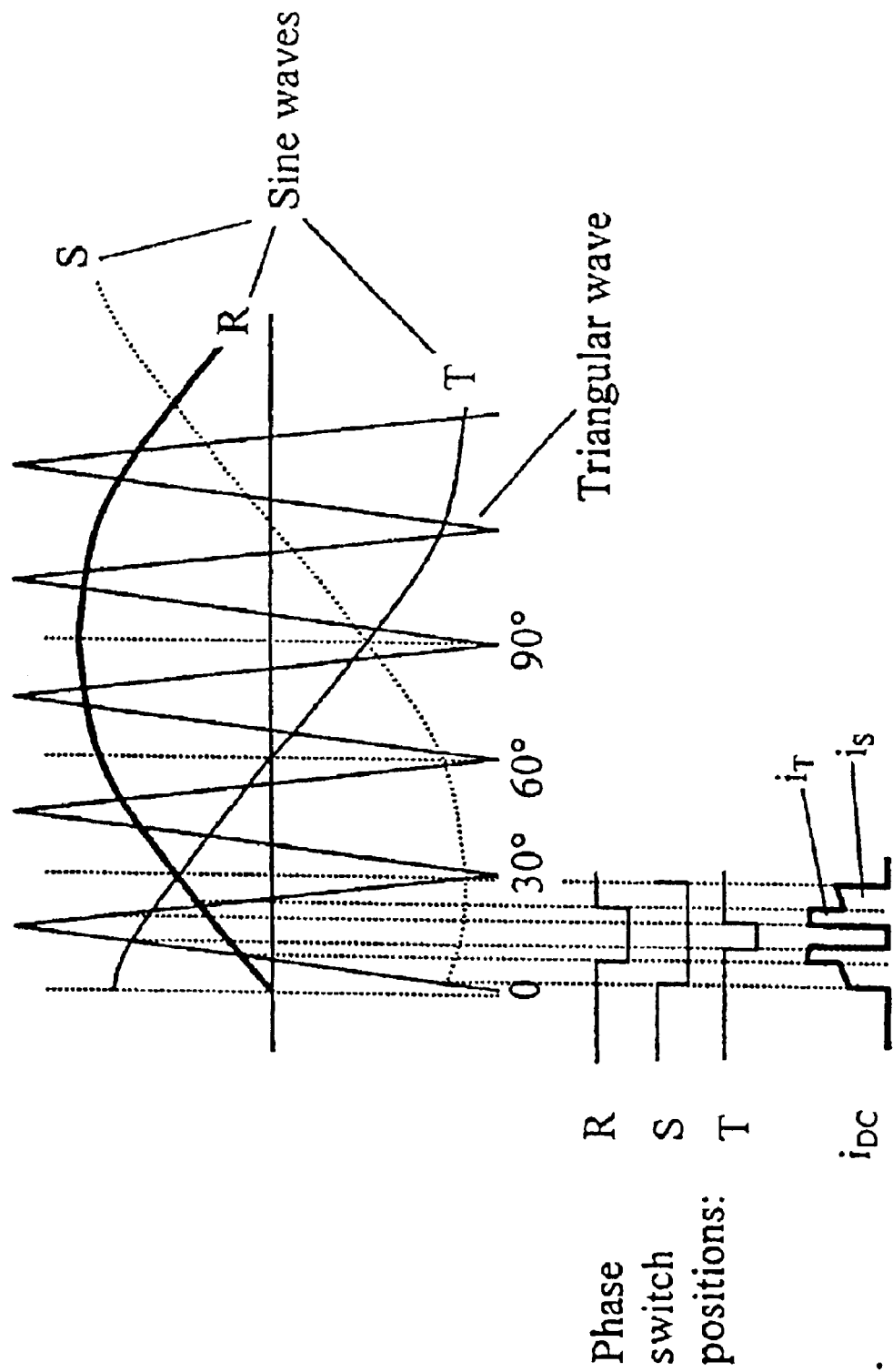
FIG. 5 illustrates the switching sequence of the phase switches in sine wave-triangular wave modulation.

In sine wave-triangular wave modulation, which at present is commonly used with partial voltages for controlling the phase switches, a sine wave R, S, T (FIG. 5) for each phase is compared with a common triangular wave. When the sine wave has a higher value than the triangular wave, the phase switch concerned is in the high position, and vice versa. On the basis of the example presented in the figure, it can be seen that the switching sequence of the phase switches e.g. from the 0-point of phase R onwards is as shown in Table 1:

TABLE 1

| Range | + → − | − → + | Direct current |
|---|---|---|---|
| 0° ... 30° | S - R - T | T - R - S | S, T |
| 30° ... 90° | S - T - R | R - T - S | R, S |

The 'direct current' column in the table indicates those output phases of whose currents there appear samples in the intermediate circuit current during modulation. For instance, samples of the R-phase current appear in the intermediate circuit current $I_{DC}$ immediately after 30°, which means that when cos φ≦0.87, the intermediate circuit current contains negative pulses. Therefore, sine wave-triangular wave modulation is not a good modulation method in the case of partial voltages, because cage induction motors generally have a lower cos φ value than this.

Figure 6:
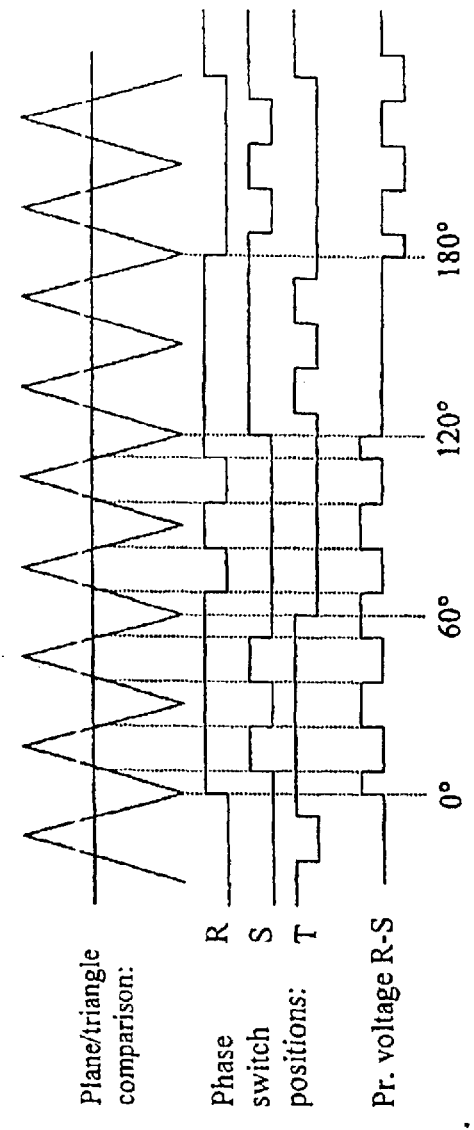
FIG. 6 illustrates plane-triangular wave modulation.
Figure 7:
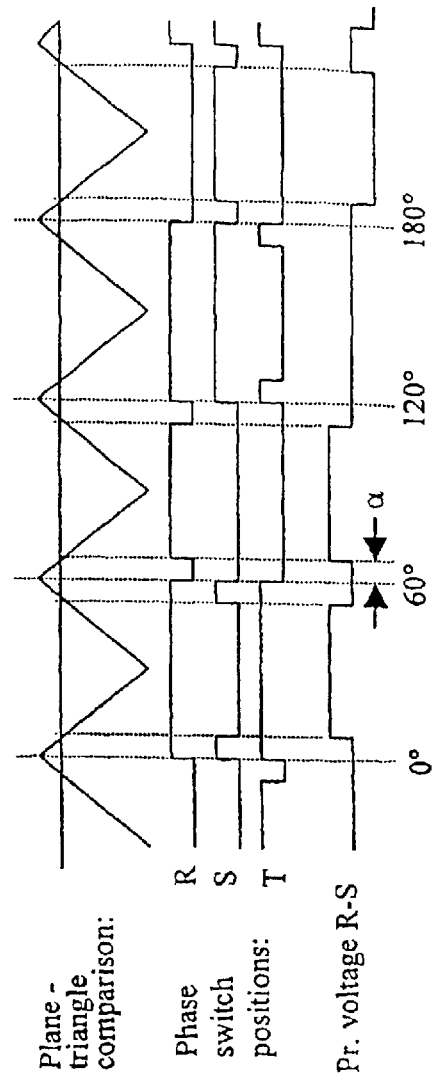
FIG. 7 illustrates two-pulse modulation.

Plane-triangular wave modulation is another generally known modulation method for the control of phase switches. The modulation works e.g. with principal voltage pulse number 5 as illustrated in FIG. 6. As can be seen from the figure, the phase switch for phase R does not assume a different position than the other two switches until in the range of 60°–120°, which means that negative pulses only appear in $I_{DC}$ when the motor circuit cos φ≦0.5. Thus, with this modulation method, the same result is reached as in a full-voltage range. The disadvantage of this modulation method is that it produces harmonics in the output current, which may appear at very low frequencies as irregular rotation of the motor.

it is possible to further extend the cos φ range where no negative pulses appear in the direct current, by applying in the case of partial voltages a two-pulse modulation method as illustrated in FIG. 7, in which the principal voltage contains two pulses for each half-cycle. As shown in the figure, the phase switch for phase R only assumes a different position than the other two phase switches after an angle 60°+α dependent on the degree of modulation has been reached, i.e. when cos φ<0.5. Therefore, with this modulation method, it is possible to operate with a positive direct current at quite low voltage and cos φ values.

Figure 8:
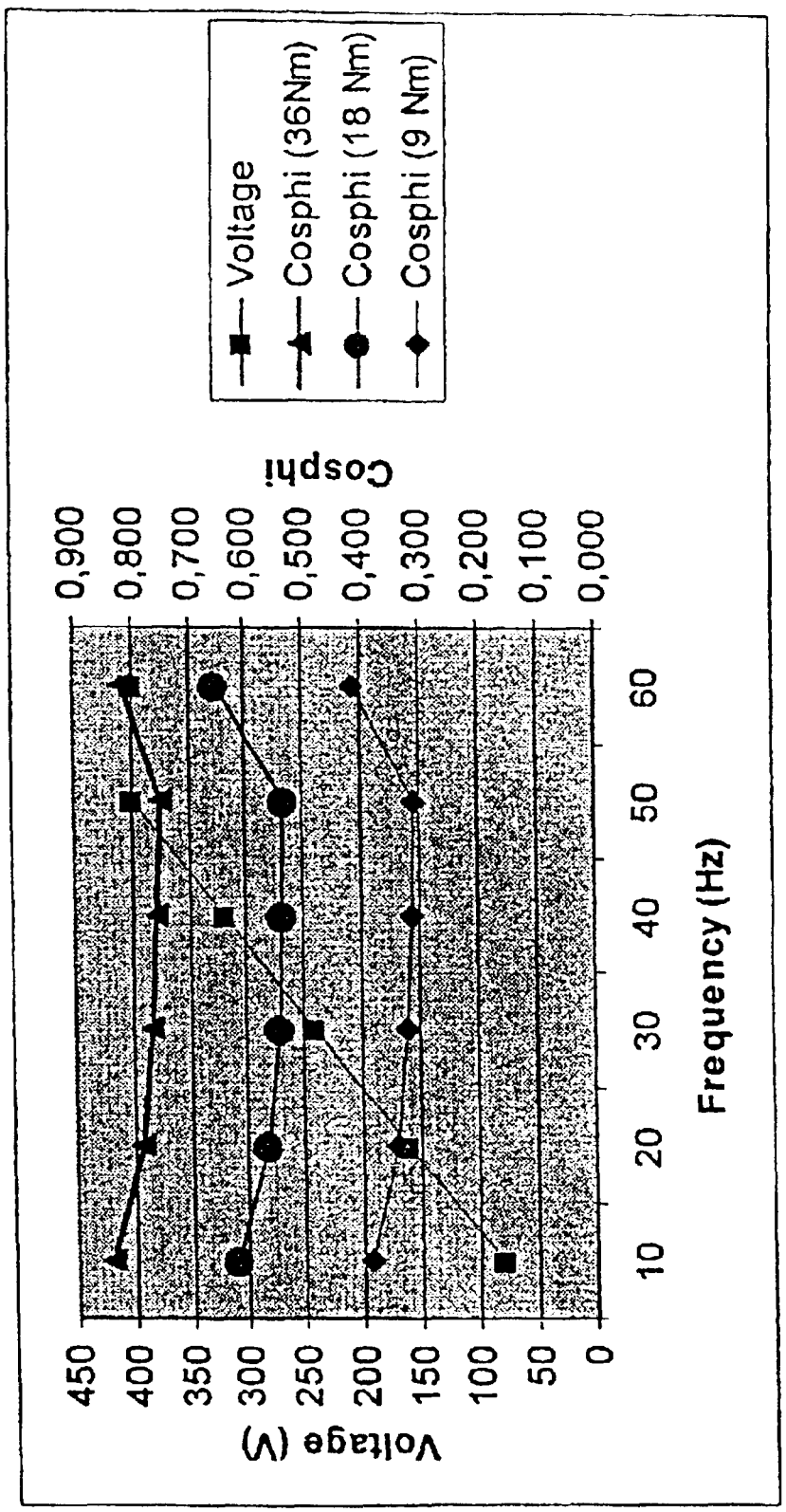
FIG. 8 illustrates the motor power factor with constant torque.

The cos φ of motors at the nominal point varies depending on the model and motor output, typical values being about 0.7 ... 0.9. For partial powers, cos φ is smaller. Frequency has no very pronounced effect on cos φ while the load (torque) is more decisive, as indicated by the example presented in FIG. 8 about a motor in constant-torque operation.

Figure 9:
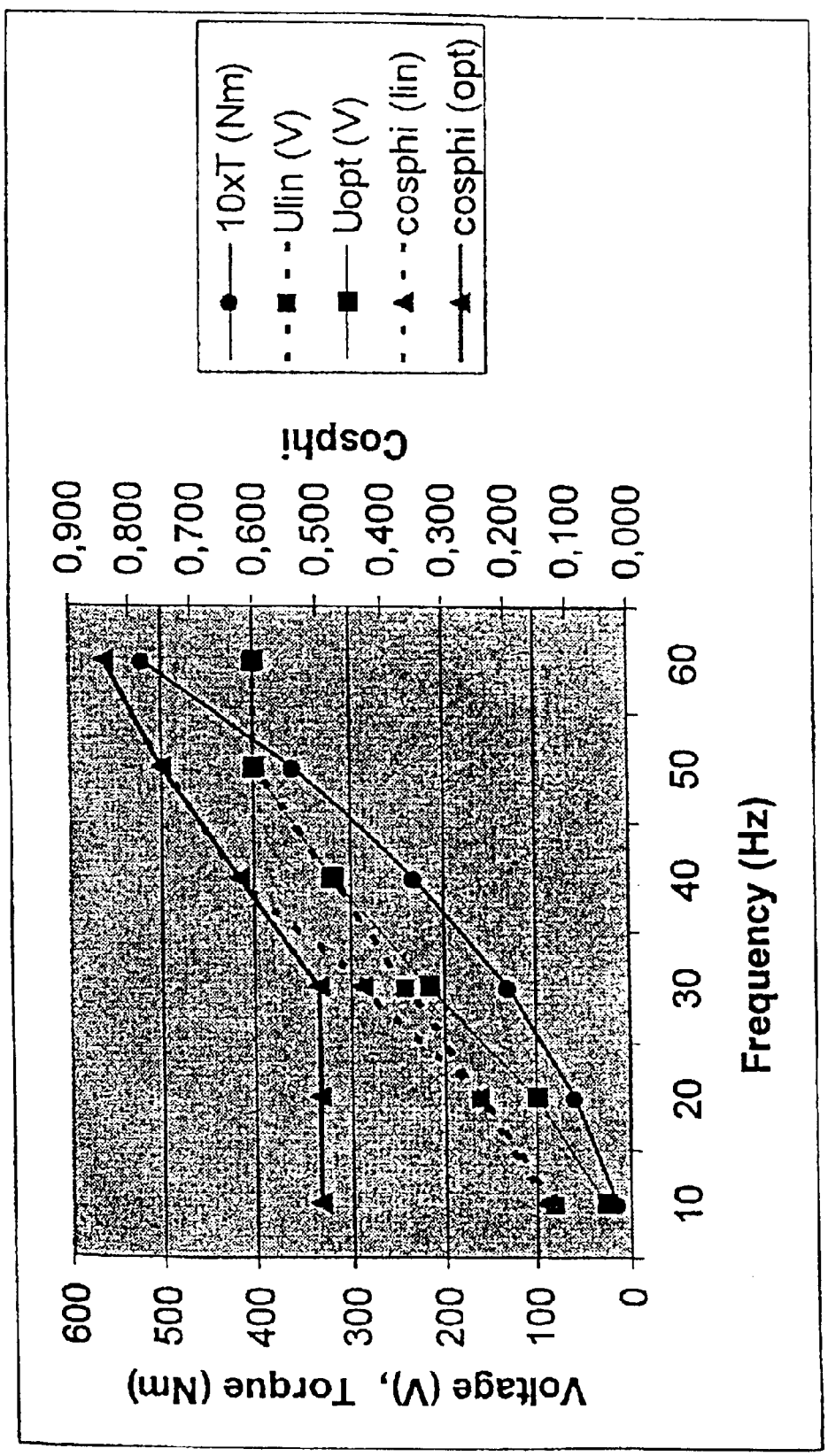
FIG. 9 illustrates the motor power factor with quadratic torque and a linear and optimized voltage.

In the case of small loads, the diminution of costs can be stemmed by lowering the motor voltage in accordance with a pre-calculated voltage curve dependent on frequency and load. By this method, it is possible to keep cos φ continuously e.g. above the limit of 0.5, which is critical in respect of plane-triangular wave modulation. FIG. 9 presents an example illustrating the behavior of cos φ in the case of a quadratic load torque T (pump and fan drives) and a linear (Ulin) and optimized (Uopt) voltage.

Among the most appropriate processes working in a single quadrant in which a frequency converter according to the second embodiment of the invention without an energy storing capacitor in the direct-voltage intermediate circuit and without a current limiting inductor at the supply is applicable are pump and fan drives, because in these the direction of power flow is always towards the motor, the load is always quadratic and the operating point is always at high frequencies, so that e.g. the fluctuation in the rotational speed of the motor produced by plane-triangular wave modulation at low frequencies is no problem.

EXAMPLE 2

Four-quadrant Drives

Figure 10:
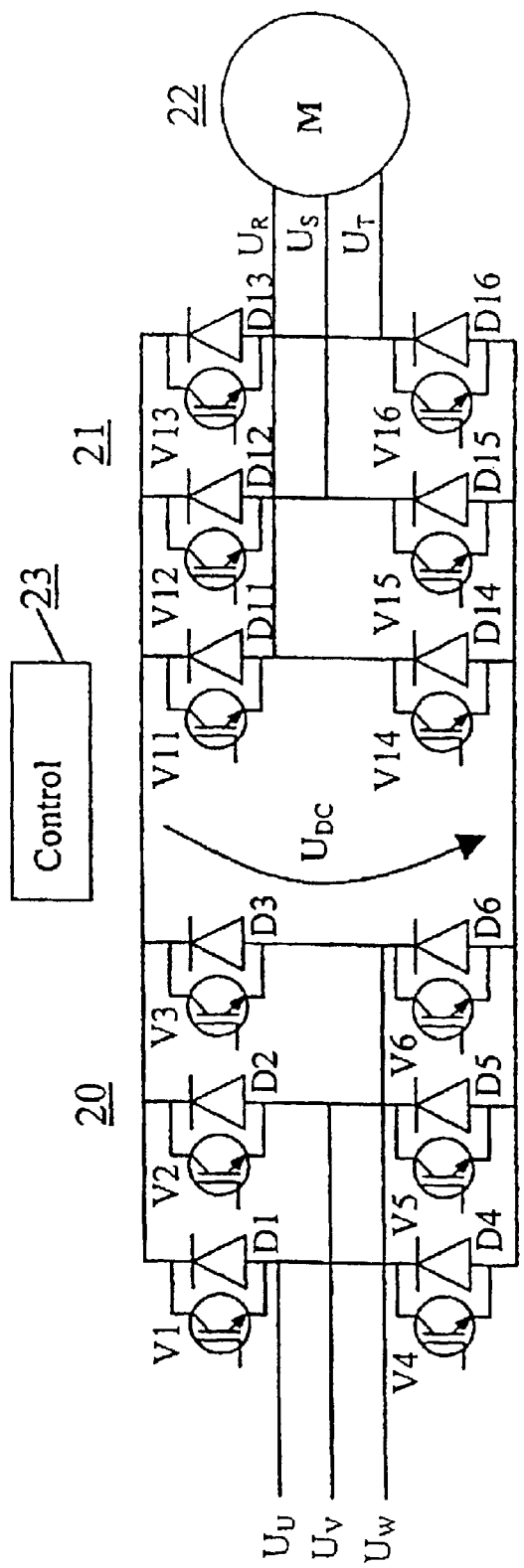
FIG. 10 presents a second voltage-controlled PWM frequency converter according to the invention.

FIG. 10 presents a three-phase voltage-controlled PWM frequency converter according to the second embodiment of the invention, which comprises a rectifier bridge 20 for the rectification of a three-phase alternating voltage consisting of phase voltages $U_U$, $U_V$, $U_W$ to produce a d.c. intermediate circuit direct voltage $U_{DC}$ and an inverter bridge 21 for the inversion of the direct voltage of the intermediate circuit to produce a variable-frequency three-phase alternating voltage consisting of phase voltages $U_R$, $U_S$, $U_T$. The frequency converter feeds a three-phase induction motor (M) 22. The inverter bridge 21 is a full-wave bridge in which a control unit 23 controls via pulse width modulation the fully-controllable semiconductor switches V11–V16 of each phase (phase R: V11, V14; phase S: V12, V15; and phase T: V13–V16), each switch being connected in inverse-parallel with a diode D11–D16.

In this embodiment, too, the rectifier bridge 20 is connected to the inverter bridge 21 directly without a direct-voltage capacitor unit functioning as an intermediate energy storage, and the direct current $I_{DC}$ produced by the rectifier bridge is passed directly to the a.c. supply line without current limitation by an inductor unit.

To allow the elimination of filtering in the direct-voltage circuit without any limitation regarding the direction of intermediate circuit current, it is necessary to use a rectifier bridge circuit that permits the flow of negative intermediate circuit current in the direction toward the supply line.

Figure 11:
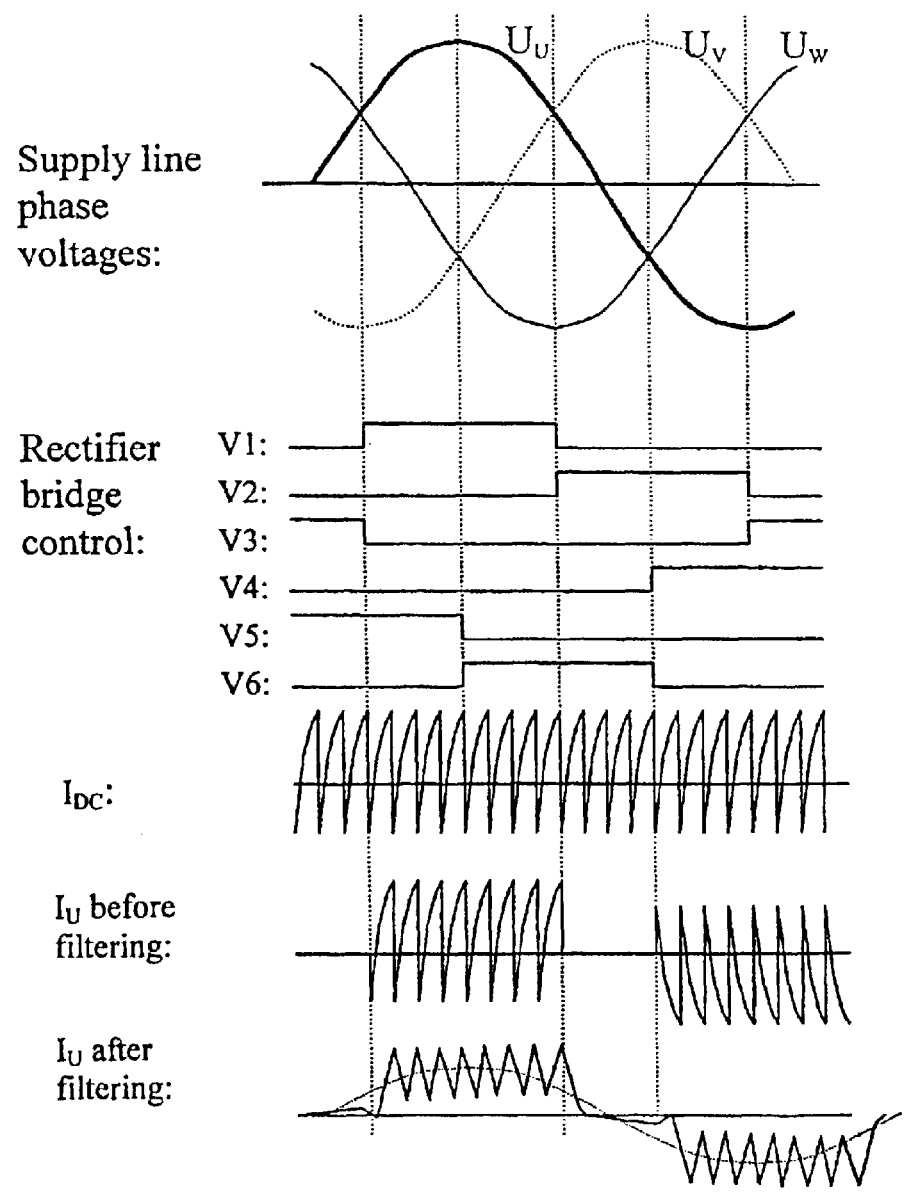
FIG. 11 illustrates the control of the rectifier bridge of a frequency converter as presented in FIG. 10 as well as its direct current and one of the phase currents.

Such a circuit for the rectifier bridge 20 is achieved by connecting a fully controllable semiconductor component, e.g. an integrated Gate Bipolar Transistor (IGBT), V1–V6, in parallel with each rectifier bridge diode D1–D6. As illustrated in FIG. 11, the rules for their control are as follows:

The IGBT in the upper arm of the phase having the highest instantaneous voltage value is conducting, and The IGBT in the lower arm of the phase having the lowest instantaneous voltage value is conducting.

In other words, if the diode connected in parallel with the IGBT is conducting when power is flowing toward the motor, then the IGBT is also kept conducting. Because of the IGBTs, power can just as readily flow in the other direction as well.

By further connecting between the supply line and the rectifier bridge e.g. an LC filter consisting of inductors and capacitors, high-frequency harmonics of the main current can be filtered as illustrated in FIG. 11.

Figure 12:
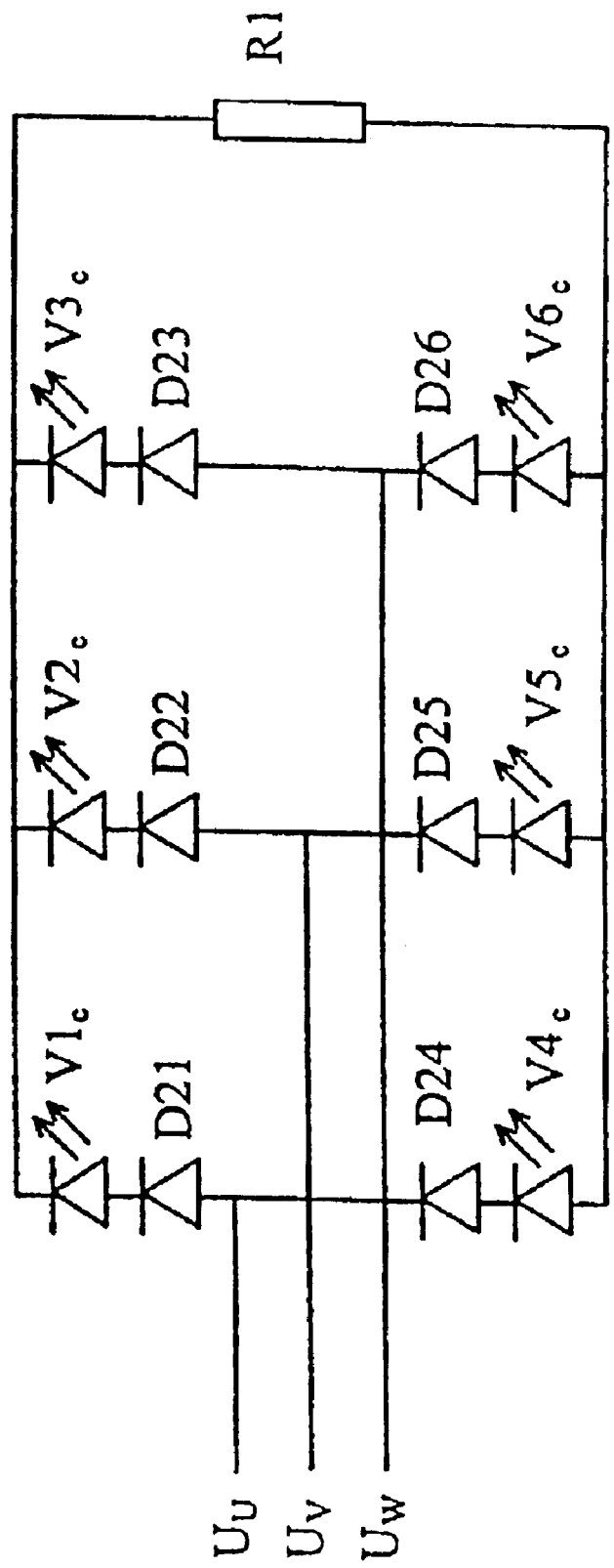
FIG. 12 presents the control electronics.

FIG. 12 presents an example of how the above-described rectifier bridge control logic can be implemented using opto-isolators. In this context, only the circuit on the side of the light emitter diodes of the opto-isolators is described. The pulse amplifier circuit on the side of the light detectors, which generates the actual voltage and current pulse needed for controlling the power semiconductors in accordance with the signal obtained from the opto-isolator, can be implemented in many known ways and will not be described here.

The circuit illustrated in FIG. 12 is connected to the same supply voltage terminals $U_U$, $U_V$, $U_W$ presented in FIG. 10 to which the rectifier bridge 20 is also connected. The circuit comprises a diode bridge D21–D26, opto-isolator emitter diodes V1c–V6c connected in series with the diodes, and a resistor R1 connected to the direct-voltage terminals of the diode bridge. In the circuit, a current determined by resistor R1 flows through those emitter diodes which, according to the control logic presented in FIG. 11, are to give a control command to the semiconductor switches V1–V6 corresponding to them. For example, a current is flowing through emitter diode V1c only when phase voltage $U_U$ is more positive than the other phase voltages. Thus, the semiconductor switch V1 corresponding to this diode will conduct at exactly the right instant.

This embodiment of the invention imposes no restrictions as to the applications of the frequency converter.

It is to be noted that the implementation of the rectifier bridge control logic does not require any measurement of mains current or direct current as do circuits implemented according to prior-art technology.

The invention can also be utilized in applications in which there are several three-phase systems feeding a common d.c. voltage intermediate circuit (e.g. 12-pulse and 18-pulse bridges), or in which there are several inverter bridges connected to the same direct-voltage intermediate circuit to feed several separate loads.

It is obvious to the person skilled in the art that the embodiments of the invention are not restricted to the examples presented above, but that they can be varied within the scope of the following claims. Besides IGBTs, the fully controllable semiconductor switches used may also consist of other fully grid-controlled semiconductor switches, i.e. switches that can be turned on and off, such as transistors.

What is claimed is:

1. A multi-phase voltage-controlled PWM frequency converter, comprising
   at least one control unit,
   at least one rectifier bridge designed to be connected to a multi-phase supply line,
   a direct-voltage intermediate circuit and at least one controlled inverter bridge for feeding at least one multi-phase load with an alternating voltage of varying magnitude and frequency,
   said inverter bridge having pulse width modulation-controlled semiconductor switches and, in parallel with these, inverse-parallel connected diodes,
   said rectifier bridge having fully controllable semiconductor switches and, in parallel with these, inverse-parallel connected diodes, and
   said control unit controlling the fully controllable semiconductor switches of the rectifier bridge so that, in an upper arm, the switch of the phase conducts substantially as long as an instantaneous value of the supply line phase voltage in question is most positive, and in a lower arm the switch of the phase conducts substantially as long as the instantaneous value of a supply line phase voltage in question is most negative,
   wherein the rectifier bridge is connected to the inverter bridge directly without a direct-voltage capacitor unit acting as an intermediate energy storage, and a direct current produced by the inverter bridge is arranged to flow directly into the supply line without a current peak value limitation by an inductor unit in a direct current (dc) side or an alternating current (ac) side of the rectifier.

2. Apparatus as defined in claim 1, wherein the control unit is provided with control devices for controlling the semiconductor switches of the rectifier bridge, said control devices being connected to the same terminals of the supply line phase voltages as the rectifier bridge.

3. Apparatus as defined in claim 2, wherein the control devices are opto-isolators, and that the control unit comprises a diode bridge, opto-isolator emitter diodes connected in series with the diode bridge diodes and a resistor connected to the direct-voltage terminals of the diode bridge, a current determined by said resistor flowing through those emitter diodes which, according to the control logic, are to give a control command to the rectifier bridge semiconductor switches corresponding to them.

4. A multi-phase voltage-controlled PWM frequency converter comprising:
   at least one control unit,
   at least one uncontrolled rectifier bridge designed to be connected to a multi-phase supply line,
   a direct-voltage intermediate circuit and at least one controlled inverter bridge (11) for feeding a multi-phase load with an alternating voltage of varying magnitude and frequency,
   said inverter bridge having pulse-width-modulation controlled semiconductor switches and, in parallel with these, inverse-parallel connected diodes,
   said rectifier bridge having diodes, and
   said control unit generating an output voltage pulse pattern so that only positive current pulses appear in the direct-voltage intermediate circuit when an output power factor is above a preset minimum value,
   wherein the control unit controls the output voltage by means of the pulse-width-modulation controlled semiconductor switches in such manner that, regardless of frequency and load, the output power factor remains above the preset minimum value, and the rectifier bridge being connected to the inverter bridge directly without a direct-voltage capacitor unit acting as an intermediate energy storage, and direct current produced by the inverter bridge is arranged to flow directly into the supply line without a limitation of a current peak value by an inductor unit in a direct current (dc) side or an alternating current (ac) side of the rectifier.

5. The multi-phase voltage-controlled PWM frequency converter according to claim 4, wherein the preset minimum value is 0.5.

6. The multi-phase voltage-controlled PWM frequency converter according to claim 4, wherein the preset minimum value is 0.5 or greater.

* * * * *